(12) United States Patent
Vasudevan et al.

(10) Patent No.: US 6,915,431 B1
(45) Date of Patent: Jul. 5, 2005

(54) SYSTEM AND METHOD FOR PROVIDING SECURITY MECHANISMS FOR SECURING NETWORK COMMUNICATION

(75) Inventors: Anil Vasudevan, Portland, OR (US); Baiju Patel, Portland, OR (US); Marc Jalfon, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/472,314

(22) Filed: Dec. 22, 1999

(51) Int. Cl.[7] .................... G06F 11/30; G06F 15/16; G06F 15/177; G06F 15/173; H04L 9/00

(52) U.S. Cl. ................. 713/171; 713/160; 713/171; 713/201; 709/203; 709/228

(58) Field of Search ................ 713/160, 164, 713/170, 171, 200, 201; 380/277; 709/203, 220–229

(56) References Cited

U.S. PATENT DOCUMENTS

| | | | | |
|---|---|---|---|---|
| 5,778,065 A | * | 7/1998 | Hauser et al. | 713/155 |
| 6,253,321 B1 | * | 6/2001 | Nikander et al. | 713/160 |
| 6,327,660 B1 | * | 12/2001 | Patel | 713/193 |
| 6,330,562 B1 | * | 12/2001 | Boden et al. | 707/10 |
| 6,349,335 B1 | * | 2/2002 | Jenney | 709/224 |
| 6,360,269 B1 | * | 3/2002 | Mamros et al. | 709/228 |
| 6,643,776 B1 | * | 11/2003 | Boden et al. | 713/200 |

OTHER PUBLICATIONS

RFC 2409–The Internet Key Exchange, Nov. 1998, pp. 1–48.*
Internet Key Exchange, Pekka Riikonen, pp. 1–6.*

* cited by examiner

Primary Examiner—Gilberto Barrón, Jr.
Assistant Examiner—Jenise Jackson
(74) Attorney, Agent, or Firm—Pillsbury Winthrop LLP (57) ABSTRACT

A system and method of providing security mechanisms for securing traffic communicated from a server system to a client system independent of the state of the client system. The server system determines whether the client system has entered an operational state. When the client system is operational, key exchange processes are initiated between the two systems, the results of the key exchange processes being the parameters for use in securing traffic communication between the two systems. The results are stored in the client system. The results are inhibited from being updated in the client system until the server system is successful in completely executing another set of key exchange processes. The results are updated with the results obtained from successful execution of the other set of key exchange processes if the execution of the other set is successful. The traffic communication is thus secured based on whatever results are stored in the client system.

36 Claims, 5 Drawing Sheets

| State of Client System | State of Server System | Attributes of Transition States |
|---|---|---|
| OS up | OS up | IPSec stack on both client and server systems<br>Newly negotiated SA Updated in client system if there is successful completion of SA refresh |
| OS hung | OS up | IPSec stack not on client system<br>Previously negotiated SA stored in client system is inhibited from being updated |
| Pre-boot | OS up | IPSec stack not on client system<br>Previously negotiated SA stored in client system is inhibited from being updated |
| OS suspend | OS up | IPSec stack not on client system<br>Previously negotiated SA stored in client system is inhibited from being updated |
| Cold-boot | OS up | Client system does not have any security context<br>Configuration option is provided for managing client system without security |
| Any state | OS hung | Client system is unmanageable by OS hung server system.<br>Fault tolerant system is provided for switching control to secondary server system |
| OS hung / Pre-boot | Cold Boot | Server system does not have any security context<br>Configuration option is provided for managing client system without security |
| Cold Boot | Cold Boot | Neither system has any security context<br>Configuration option is provided for allowing traffic to be communicated in the clear |

SYSTEM AND METHOD FOR PROVIDING SECURITY MECHANISMS FOR SECURING NETWORK COMMUNICATION

BACKGROUND OF THE INVENTION

1. Field of the Invention

The present invention relates to computer networks and network security, and in particular, to systems and methods for providing security mechanisms for securing manageability in a computer network.

2. Related Art

Computer networks in business enterprises, such as a local area network (LAN), wide area network (WAN) or other Ethernet-based systems facilitate communication among computer workstations. With the recent evolution of networking and Internet communications, computer networks have become more open to the world. While this certainly speeds business operations, it brings with it other perils. Having computer networks more open to the world can often leave data and networks traffic open to unintended access. An outsider may install and use a program to monitor the network traffic, alter or modify data streams in transit, or steal an identity to gain unauthorized access into a network. Therefore, a secure environment requires protection at the network level.

A typical LAN couples together one, or a relatively small number of, server systems and potentially large number of client systems. Network traffic communicated between any two systems is in the form of data packets and utilizes protocols regulating the way the data packets are transmitted between the two systems. Many security protocols are provided for securing network traffic. In the case of a LAN, Internet Protocol Security (IPSec) technology has emerged as the LAN security protocol of choice. IPSec allows business enterprises to add internal LAN protection, building communications security into the data packet itself and securing client/server communications. IPSec operates at the network layer of the protocol stack, i.e., Layer 3 in the Open System Interconnection (OSI) model, and can be used to provide three different types of protection: authentication, integrity and encryption.

IPSec may be applied in many instances. For example, the server system may be a remote management station wishing to communicate certain management traffic to a client system. The remote management station would utilize a management IP based protocol, such as IPSec, to initiate certain management operations on the client system. This is especially true when the client system becomes non-operational, e.g., when the client system is in a pre-boot state, a hung state, or a reset state. In this case, the remote management station would want to send out management commands to try and get the client system back to an operational state. For example, the management commands may include reset, reboot, power down, or power up. These heavy-duty control commands, which can reset or reboot any client systems connected in a network, need to be securely communicated. When a client system is non-operational and another system is trying to manage the client system, care must be taken to make sure that the other system is indeed a management station that the client system trusts.

A typical communication security protocol between two systems has two phases. In the first phase, typically referred to by the name "key exchange", the systems authenticate each other as well as negotiate and agree upon exact parameters and keys to'be used to secure subsequent network traffic. The parameters and keys to be used represent the results obtained after carrying out the key exchange processes, and are often referred to as security association (SA). The SA contains settings like policies and the extent of the strength of the security that is employed on a connection basis. In the second phase, network traffic is secured based on the results obtained in the first phase.

The typical security protocols like the key exchange processes are fairly complex and require many exchanges and computationally intensive operations. This means they do not work well when the operating system (OS) of the client system is absent, i.e., when the client system is non-operational. Although existing security mechanisms, such as those utilizing IPSec and Internet Key Exchange (IKE), are able to secure network traffic when both the client system and server system are operational, they cannot secure network traffic when the OS of the client system is non-operational or absent. There is a need for a method to securely communicate network traffic, regardless of the state of the client system under consideration.

SUMMARY

Embodiments of the present invention are directed to addressing the aforementioned drawbacks associated with providing security mechanisms for securing traffic communicated from one system to another system, even when one of the systems is non-operational. An embodiment of the present invention is directed to a system and method of providing security mechanisms for securing traffic communication between a server system and a client system regardless of the state of the client system under consideration. First, the client system is polled to determine whether it is in an operational state. As soon as the client system enters the operational state, key exchange processes are initiated and executed between the server system and the client system. At the end of the key exchange processes, the results of the key exchange processes are stored into the client system. The traffic communication between the server system and the client system is secured based on the stored results in the client system. In order to maintain a highly secured environment, the stored results in the client system are periodically refreshed and updated with newly obtained results by executing a second set of key exchange processes between the server system and the client system.

However, by inhibiting the stored results in the client system from being updated until a successful execution of the second set of key exchange processes is actually carried out, the system ensures that the traffic is securely communicated even if the client system becomes non-operational. In this case, the system will use the previously negotiated results stored in the client system as the basis for securing the traffic communication. Thus, traffic communication between the server system and the client system can be secured at all times, even in a non-operation state.

DETAILED DESCRIPTION

Embodiments of the present invention are directed to a system and method of providing security mechanisms for securing traffic communicated from one system to another system independently of whether the latter system is running normally, or is in a non-operational state. The systems are preferably a server system and a client system, each system containing an operating system and being connected through a computer network. The server system preferably determines whether the client system has entered fully operational state. Once the client system enters the fully operational state, key exchange processes are initiated between the two systems to obtain security parameters for use in securing traffic communication between the two systems. The security parameters, called SA, are the results acquired at the end of the key exchange processes. After the key exchange processes are over, the SA is stored in the client system. To maintain a highly secured environment, the server system periodically refreshes the SA by periodically executing another set of key exchange processes, and communicates the newly obtained SA to the client system for storing them in the client system in place of the original security association. However, the SA is inhibited from being updated in the client system until the server system is successful in completely executing another set of key exchange processes. The traffic communication is then secured based on whichever SA is stored in the client system. Depending on whether the other set of key exchange process is successful, the traffic communication is secured on the basis of either the original SA or the newly obtained SA.

Figure 1:
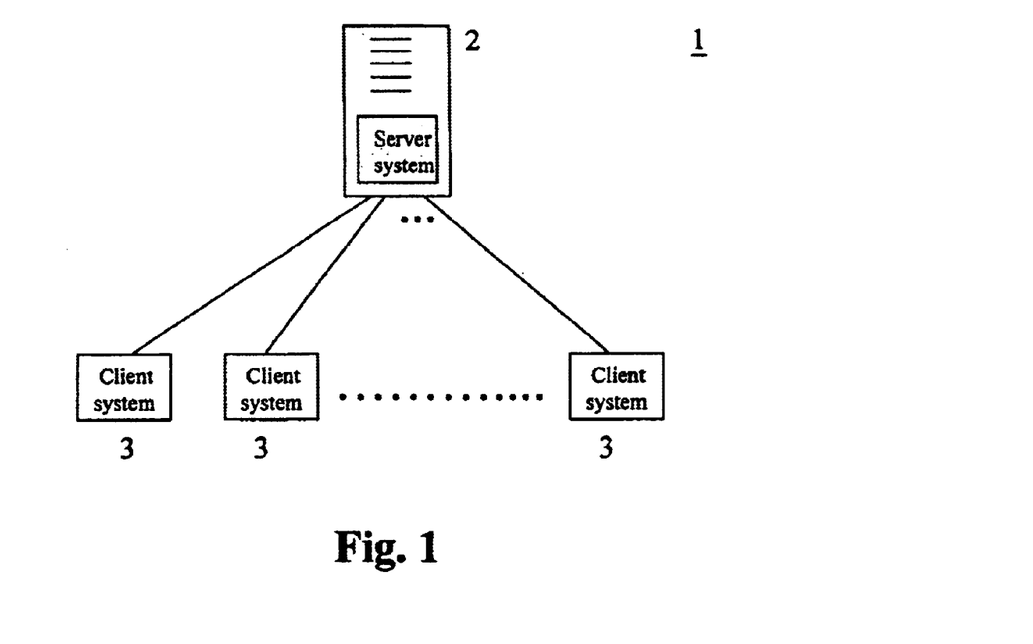
FIG. 1 shows a local area network coupling a server system and a client system according to an embodiment of the invention.

FIG. 1 shows a server system 2 and a plurality of client systems 3 coupled in a LAN 1 according to an embodiment of the invention. The typical arrangement of an environment on a network includes one, or a relative small number of, the server system 2 and a potentially large number of client systems 3. In other embodiments, the server system and client systems may be coupled through a WAN, the Internet, or any other network having an Internet Protocol (IP) based protocol for transmitting data packets.

Figure 2:
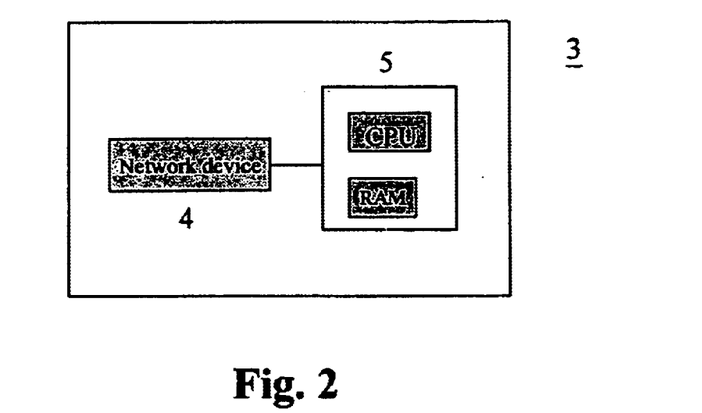
FIG. 2 shows in more detail an embodiment of the client system according to the embodiment of FIG. 1.

FIG. 2 shows in more detail an embodiment of the client system 3 in FIG. 1. The client system 3 includes a network device 4 and a processor 5 for executing computer instructions. According to an embodiment, the processor 5 of the client system 3 includes a central processing unit (CPU) and random access memory (RAM) which is sufficient to support a Windows '95, Windows '98, Windows 2000, or Windows NT 4.0 operating system and application programs compatible with these operating systems. In other embodiments, combinations of different operating systems and different application programs may be implemented in the client system 3. According to an embodiment, a remote server system 2 manages the client system 3 by communicating to client system 3 the management functions required to be performed. In the embodiment, the server system utilizes a management IP based protocol in carrying out certain control/diagnostic operations on a client system 3. In the embodiment, security mechanisms, independent of the state the client system 3 is in, are provided, so that management IP based protocol packets can be securely communicated from the remote server system 2 to the client system 3 at all times. This way, the security mechanisms ensure that the management IP based protocol packets originate from a trusted server system 2. For example, the security mechanisms may be used to secure remote management and control protocol (RMCP) packets using IPSec through the various stages in the life cycle of the server system 2 and the client system 3.

According to an embodiment, the control/diagnostic operations are performed through the network device 4 in the client system 3. The management IP based protocol is usually fairly simple and uses a particular user datagram protocol (UDP) port to communicate the management traffic. With the security mechanisms, the remote server system 2 securely communicates the management traffic to the network device 4. After the network device 4 intercepts the management traffic, it triggers certain control/diagnostic operations, such as reboot, on the client system 3. In other embodiments, the network device 4 may be considered as the client system, in which the security mechanisms are provided to secure communication between a server system and a network device.

In a preferred embodiment, the security mechanisms operate mainly at the network layer of the seven-layer protocol stack, i.e., Layer 3 in the OSI stack. The network layer embodiment is preferred because of the existence of the IPSec. In other embodiments, the IP based protocol used by the security mechanisms along with the IP based protocol packets may use higher layers of the OSI stack. Moreover, the security mechanisms may be implemented in the data-link layer, i.e., Layer 2 in the OSI stack. For example, the server system may dial in to the client system, and send traffic communication at the point to point protocol (PPP) layer.

Figure 3:
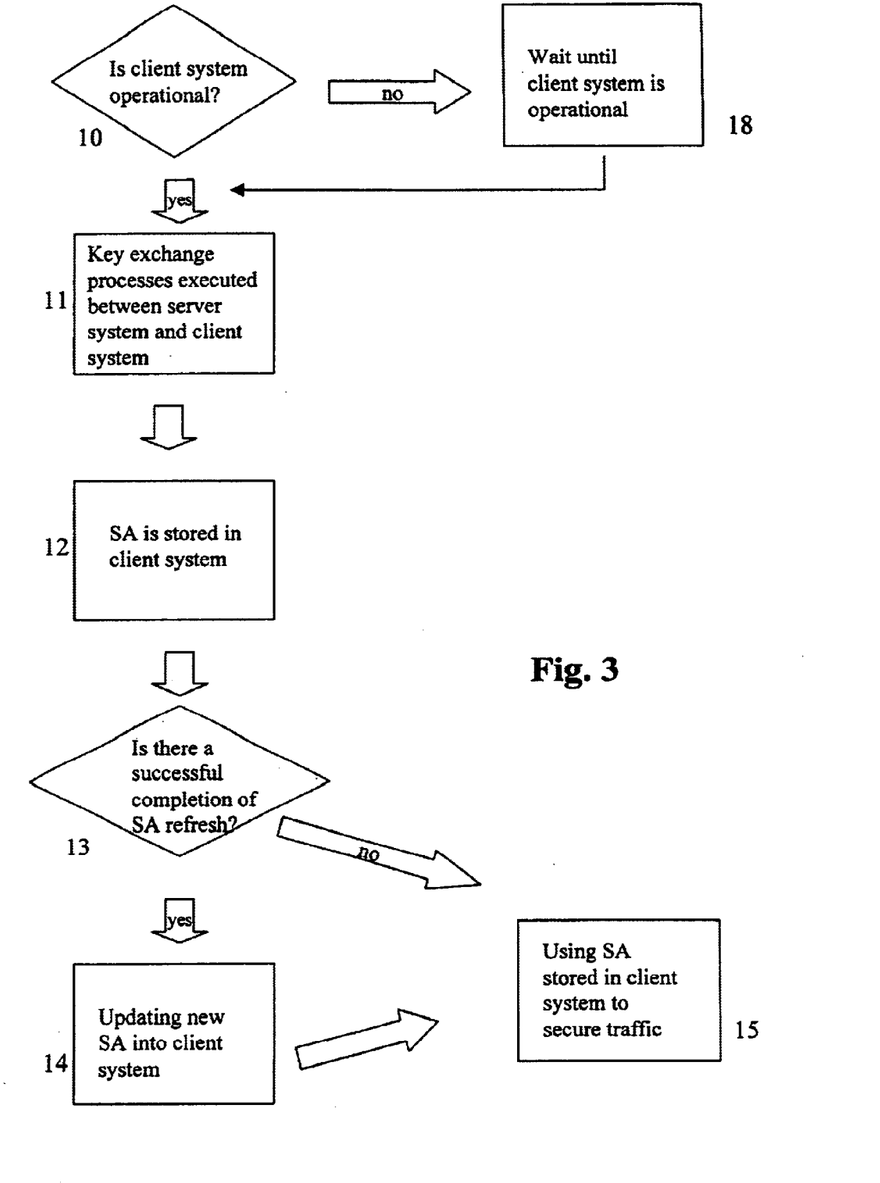
FIG. 3 illustrates processes for carrying out security mechanisms according to an embodiment of the invention.

FIG. 3 illustrates processes for carrying out security mechanisms according to an embodiment of the invention. In step 10, security mechanisms are initiated by a server system to detect whether a client system is operational. If the client system is operational, key exchange processes are executed between the server system and the client system in step 11, at the end of which the results of the key exchange process, or SA, are obtained. According to one embodiment, key exchange processes are carried out utilizing IKE, which supports the verification of identities. IKE is a hybrid protocol, and its purpose is to negotiate and provide authenticated keying material for IPSec SAs that are used for Authentication Header (AH) and Encapsulating Security Payload (ESP) processing. After the SA is obtained after the execution of the key exchange processes in step 11, the SA is stored in the client system in step 12. In one embodiment, the SA is stored in a network device that is part of the client system. For example, the SA is stored in an Ethernet device. In other embodiments, the network device itself is considered as the client system, and the SA is stored in a component part of the network device. For example, the SA is stored in a coprocessor connected to an Ethernet device or an EEPROM/flash that is part of an Ethernet device.

After the SA is stored, the server system initiates refreshing of the SA by executing another set of key exchange processes based on a SA refresh timer. Periodically refreshing of the SA to generate new SA is required to provide an environment with more security and protection. Steps 13 and 14 may be viewed as mechanisms for inhibiting the SA in the client system from being updated until there is a successful completion of the SA refresh in the server system. The SA in the client system is updated only after a successful refresh is completed. In step 15, the traffic communication is secured based on the results stored in the client system. Thus, depending on whether another set of key exchange processes between the server system and the client system is successful, the traffic communication is secured either with the SA stored in step 12, or the updated SA in step 14.

According to one embodiment, when the network device in the client system receives a secured packet through the network, it processes the packet to validate security of the packet based on whatever SA is stored in the client system. This may involve, for example, cryptographic hash, decryption, and other processes such as checks for replay attacks. After successful processing of packet for security, the network device forwards the packet to a processor in the client system, allowing normal remote management processing. Similarly, any response generated by the management module to be sent to the server system is also processed for security based on the prior SA negotiation.

Figure 4:
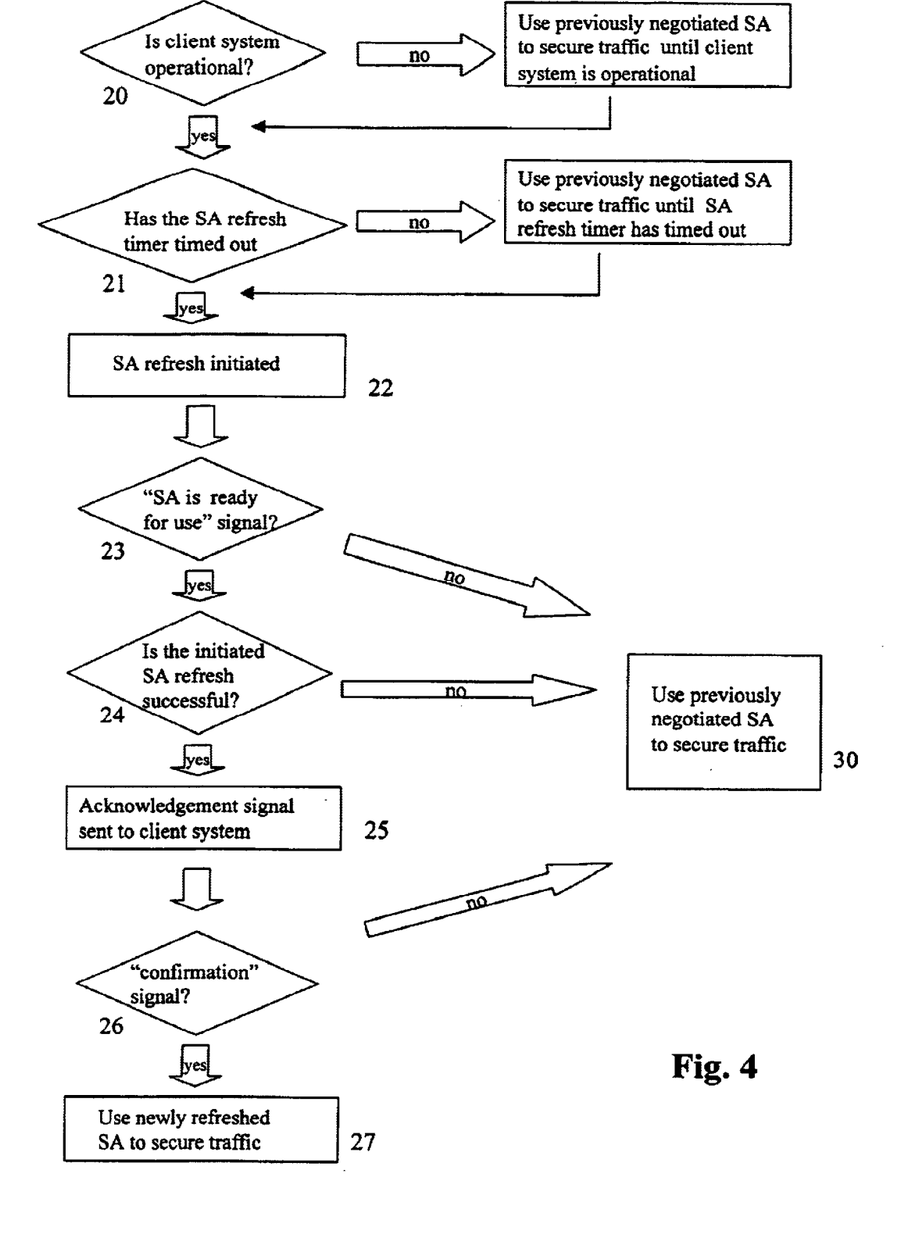
FIG. 4 illustrates processes for updating the results of key exchange processes at a server system according to an embodiment of the invention.

FIG. 4 illustrates processes for updating SA at a server system according to an embodiment of the invention. In step 20, the server system determines whether the client system is operational. If the client system is non-operational, previously negotiated SA, which is the same SA as the one stored in the client system, is used to secure traffic communication until the client becomes operational. If the client system is operational, the server system determines whether SA should be refreshed based on a SA refresh timer, according to an embodiment of the invention. In step 21, the server system asks whether the SA refresh timer has timed out. If it has not, the previously negotiated SA is used to secure traffic communication until the SA refresh timer has timed out. On the other hand, if the timer has timed out, the server system initiates a SA refresh in step 22 by carrying out another set of key exchange processes. According to an embodiment, the time between consecutive refresh of SA is set to be significantly smaller than the lifetime of the SA, where the difference must be at least as large as the maximum allowed down time before the client system is managed. In a conservative design, one may choose a very large lifetime for SA, while refreshing SA fairly frequently. For example, the lifetime for SA may be in years, while refreshing the SA may be in hours or minutes.

In step 23, the server system determines whether it has received a "SA is ready for use" signal from the client system. If such signal is not received, the previously negotiated SA is used to secure traffic communication in step 30. If such signal has been received, the server system checks whether the other set of key exchange is successfully completed in step 24. If there is an unsuccessful completion of the SA refresh, the previously negotiated SA is used to secure traffic communication in step 30. If there is a successful completion of the SA refresh, the server system sends an acknowledgement signal to the client system and waits for a confirmation signal from the client system confirming the receipt of the acknowledgement signal (steps 25 and 26). If confirmation is not received from the client system, the previously negotiated SA is used to secure traffic communication in step 30. On the other hand, if confirmation is received, the newly refreshed SA is used to secure traffic communication in step 27.

Figure 5:
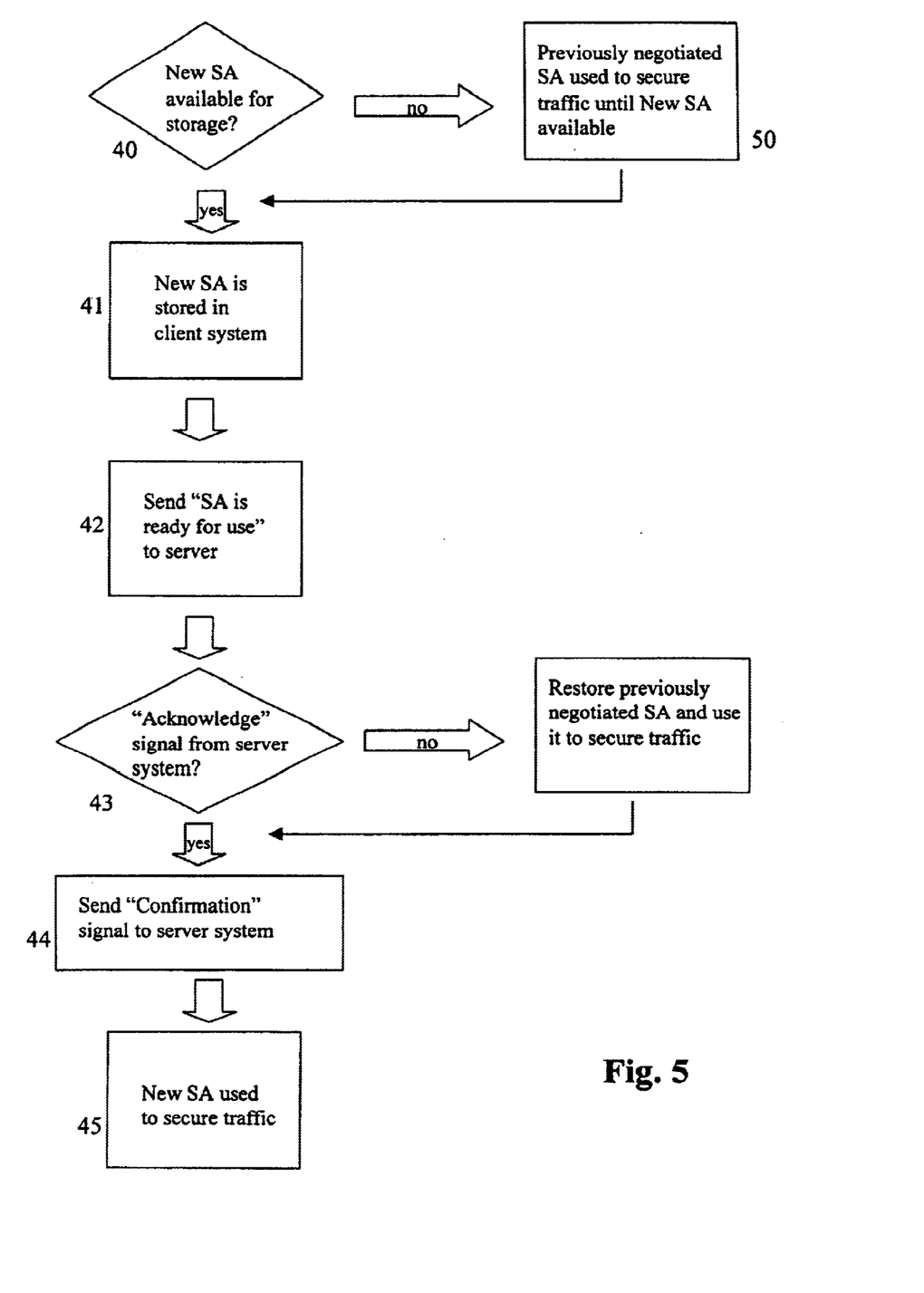
FIG. 5 illustrates processes for updating the results of key exchange processes at a client system according to an embodiment of the invention.

FIG. 5 illustrates processes for updating SA at a client system according to an embodiment of the invention. In step 40, the client system determines whether there is new SA available for storage. If new SA is not available, then the client system uses the previously negotiated SA that is stored in the client system to secure traffic communication until the new SA is available. If a new SA is available, the new SA is stored in the client system in step 41. According to an embodiment, the new SA is stored in hardware of the client system, preferably a network device. In step 42, the client system indicates that the new SA is ready for use by sending the "SA is ready for use" signal to the server system. In step 43, the client system waits for the acknowledgement signal from the server system. If the acknowledgement signal is not received, then the client system restores the previously negotiated SA and uses it to secure the traffic communication in step 52. If the acknowledgement is received, the client system sends the confirmation signal to the server client in step 44. In step 45, the new SA is used to secure the traffic communication.

According to one embodiment, the client system provides configuration options such that it can be managed with or without security. When a new client system is installed and does not have any OS present, the key exchange processes cannot be executed. The new client system is managed without security through configuration options by using some non-volatile storage such as an EEPROM or a register. By setting appropriate bits on the non-volatile storage, securing traffic is controlled. In another embodiment, a server system fails and becomes non-operational while the client system becomes non-operational. As a result, SAs on the server system are lost and no longer exist on the server system. In this case, the server system implements a persistent store for storing SAs that are in use with a plurality of client systems. The previously negotiated SAs are then easily restored. The persistent store may be some non-volatile storage such as an EEPROM.

Figure 6:
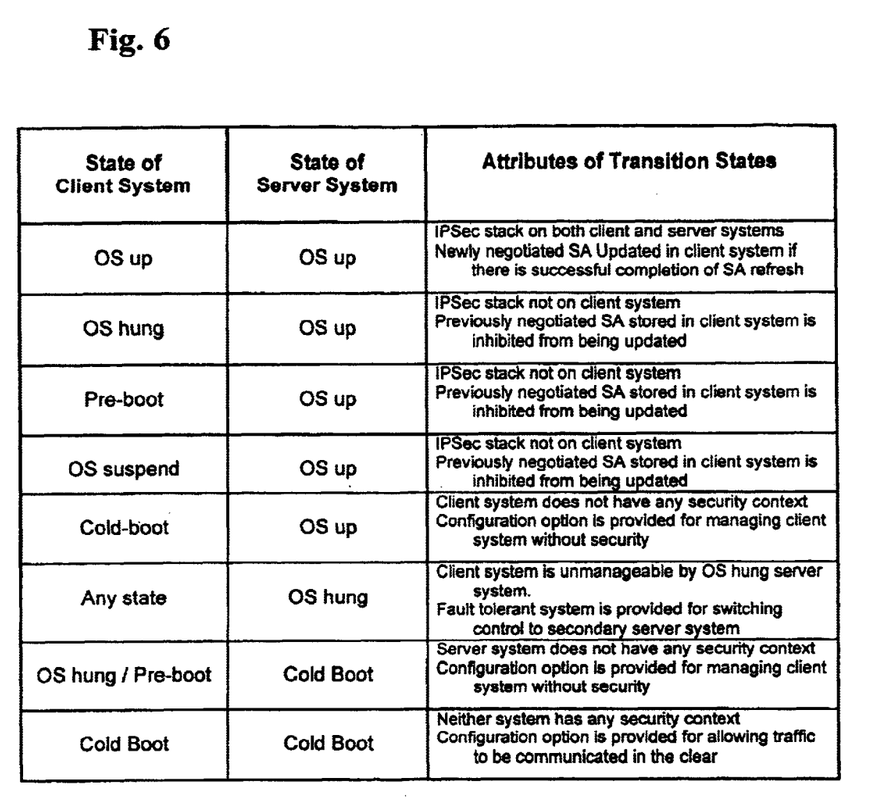
FIG. 6 shows a table illustrating the relationship between a server system and a client system during different state transitions according to an embodiment of the invention.

FIG. 6 shows a table illustrating the relationship between a server system and a client system during different state transitions according to an embodiment. Each row represents a transition state for the client system and the server system, and describes attributes of the transition state. The first column of the table represents the state of the client system, and the second column represents the state of the server system. The third column describes attributes of the transition states.

In the embodiment, the states the server system or the client system could be in are "OS up," "OS Hung," "Pre-boot," "OS suspend," "Cold boot," and "Any state." "OS up" represents a state when a system is fully operational, having IKE running on the system and an established security context. "OS Hung" represents a state when a system hangs after a successful boot, having a pre-established security context, but IKE being unavailable. "Pre-boot" represents a state when a system is reset, having a pre-established security context, but IKE being unavailable. "Cold-boot" represents a state when a system comes out cold, having no security context to rely upon. "OS suspend" represents a state when a system is temporarily suspended, e.g., to conserve power when not being used (the system comes back into OS up state via a wake up event). In this state, the system has a pre-established security context, but IKE is unavailable. "Any state" refers to any of the above mentioned states.

According to one embodiment, IPSec traffic is keyed by a total cost of ownership (TCO) port, wherein the policies that are set for securing the TCO port are as follows: SA lifetime=infinite (either in time or kilobytes), Protocol=UDP, IPSec protocol=ESP+AH, Destination port=298 h, other parameters=Wildcards. Row 2 indicates the case where the server system is "OS up" and the client system transitions to an "OS up" state. Since both systems are "OS up," they are fully operational with the IPSec stack on both systems. This allows for regular IPSec traffic keyed by the TCO port. When the client system transitions to an "OS up" state, a SA refresh is employed, and new SA would be updated in the client system and used to secure the traffic communication if there is a successful completion of the SA refresh. This ensures that there are no sequence number synchronization issues that have to be addressed.

Row 3 indicates the case where the server system is "OS up" and the client system transitions to an "OS hung" state. Row 4 indicates the case where the server system is "OS up" and the client system transitions to a "Pre-boot" state. Row 5 indicates the case where the server system is "OS up" and the client system transitions to a "OS suspend" state. When the client system undergoes a transition from an "OS up" state to a "OS hung," "Pre-boot" or "OS suspend" state, the previously negotiated SA stored in the client system is inhibited from being updated until a successful execution of another set of key exchange processes between the server system and the client system. In this case, the previously negotiated SA is still operational because it is stored in the client system. According to an embodiment, the server system stops renegotiating new SA by not completing a SA refresh since IKE does not exist anymore, and the server system continues to use previously negotiated SA to secure traffic communication. In other embodiments, selective communication is permitted on an insecure port, which can be enabled based on lack of communication with the server.

Row 6 indicates the case where the server system is "OS up" and the client system is "Cold-boot." When the client system is in such state, the client system does not have any security information. For example, a new system is in "Cold-boot" when it is installed and does not have any OS present, and therefore, the key exchange part of the security protocol cannot be executed. According to one embodiment, the client system provides a configuration option such that it can be managed with or without security. In this case, the client system sends traffic communication in the clear, preferably with restrictions on the data, to the server system. In order to make it easier on the server, the traffic communication sent in clear may be sent on a different UDP port.

Row 7 indicates the case where the server system is "OS hung" and the client system is "Any state." Under this condition the client system is unmanageable by the server system because the server system is non-operational. A fault tolerant system is implemented for this case, wherein the fault tolerant system switches the control from the "OS hung" sever to an "OS up" secondary server.

Row 8 indicates the case where the server system is "Cold-boot" and the client system is "OS Hung or Pre-boot." Since the server system is in "Cold-boot," the server system does not have any security information. According to one embodiment, the client system provides a configuration option such that it can be managed with or without security. In this case, the client system takes unilateral action and communicates on an insecure port. The client system sends traffic communication in the clear, preferably with restrictions on the data, to the server system.

Row 9 indicates the case where the server system is "Cold-boot" and the client system is "Cold-boot." Since both systems are in "Cold-boot," neither one has any security information. In this case, the traffic communication is in the clear on the insecure port until such time that a security context can be established.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of providing security mechanisms for securing traffic communication between a server system and a client system, the method comprising:

detecting whether the client system is in an operational state;

executing first key exchange processes between the server system and the client system if the client system is in the operational state;

storing the results of the first key exchange processes into the client system;

inhibiting the stored results from being updated until a successful execution of second key exchange processes between the server system and the client system;

and using the stored results of the first key exchange processes to secure the traffic communication if the second key exchange processes are not successful because the client system becomes non-operational, wherein the results of the first key exchange process are utilized even if a security parameter refresh timer has elapsed and no acknowledgment signal is received.

2. The method of claim 1, further including allowing the traffic communication between the server system and the client system to be sent without security.

3. The method of claim 1, wherein the results of the first key exchange processes and the second key exchange processes are stored into at least one of a network device, a coprocessor connected to a network device, and non-volatile storage that is part of a network device.

4. The method of claim 1, wherein inhibiting the stored results of the first key exchange processes from being updated includes:

sending a signal acknowledging the successful execution of the second key exchange processes; and sending a signal confirming receipt of the acknowledgement signal.

5. The method of claim 1, further including storing the results of the first key exchange processes and the second key exchange processes into the server system.

6. The method of claim 1, further including switching the server system to a second server system in the computer network if the server system becomes non-operational, the security mechanisms securing traffic communication between the second server system and the client system.

7. A client system, comprising:

logic for executing a first key exchange process between a server and the client system to product results;

a storage device to store the results of the first key exchange process;

logic for inhibiting the stored results of the first key exchange process from being updated until a second key exchange process is successful;

logic for updating the stored results of the first key exchange process if execution of second key exchange process is successful; and logic to secure the traffic communication between the client system and the server system utilizing the results of the first key exchange process if the second key exchange process is not successful because the client system becomes non-operational, wherein the results of the first key exchange process are utilized even if a security parameter refresh timer has elapsed and no acknowledgment signal is received.

8. The client system of claim 7, further including logic for allowing the traffic communication between the server system and the client system to be sent without security.

9. The client system of claim 7, wherein the client system is a network device.

10. The client system of claim 7, wherein the storage device is at least one of an Ethernet device, a coprocessor connected to the Ethernet device, and a non-volatile storage that is part of the Ethernet device.

11. A method of securing traffic communications between a client system and a server system, comprising:
  executing a first key exchange process between the server system and the client system if the client system is in an operational state;
  storing results of the first key exchange process in the client system;
  inhibiting the stored results from being updated until a successful execution of a second key exchange process between the server system and the client system; and
  using the stored results of the first key exchange process to secure the traffic communication if the second key exchange process is not successful because the client system becomes non-operational even if a security parameter refresh timer has elapsed and no acknowledgment is received.

12. A method of providing security mechanisms for securing traffic communication between a server system and a client system, the method comprising:
  detecting, at the client system, whether the client system is in an operational state;
  initiating first key exchange processes, from the client system, between the server system and the client system if the client system is in the operational state;
  storing the results of the first key exchange processes in the client system;
  inhibiting the stored results from being updated in the client system until a successful execution of a second key exchange processes between the server system and the client system; and
  using the stored results of the first key exchange processes to secure the traffic communication if the second key exchange processes are not successful if the client system becomes non-operational, wherein using the stored results to secure the traffic communication further includes receiving management Internet Protocol-based packets from the server system at the client system, if the client system is determined to be non-operational, to perform diagnostic operations on the client system.

13. The method of claim 12, wherein the traffic communication between the server system and the client system is sent without security.

14. The method of claim 12, further including switching communications to a second server system if the server becomes non-operational.

15. A computer readable medium, the computer readable medium including computer readable instructions encoded thereon, which when executed cause a client system to:
  execute a first key exchange process between a server system and the client system if the client system is in an operational state;
  store results of the first key exchange process in the client system;
  inhibit the stored results from being updated until a successful execution of a second key exchange process between the server system and the client system; and
  use the stored results of the first key exchange process to secure the traffic communication if the second key exchange process is not successful because the client system is non-operational even if a security parameter refresh timer has elapsed and an acknowledgment message is not received at the client system.

16. The computer readable medium of claim 15, further including computer readable instructions encoded thereon, which when executed cause the client system to allow the traffic communication between the server system and the client system to be sent without security.

17. The computer readable medium of claim 15, wherein the instructions to inhibit the stored results of the first key exchange process from being updated include sending a signal acknowledging the successful execution of the second key exchange process; and
  sending a signal confirming receipt of the acknowledgment signal.

18. The computer readable medium of claim 15, further including computer readable instructions encoded thereon, which when executed cause the client system to switch the server system to a second server system in the computer network if the server system becomes non-operational, where the second server system includes security mechanisms for securing traffic communication between the second server system and the client system.

19. A method, comprising:
  determining whether a client system is in an operational state;
  initiating a first key exchange process, at a server system, between the server system and the client system to produce results;
  storing the results, at the server system, of the first key exchange process;
  inhibiting the stored results of the first key exchange process from being updated until a successful execution of a second key exchange process between the server system and the client system;
  updating the stored results of the first key exchange process at the server system if the execution of the second key exchange process is successful;
  securing traffic communication between the client system and the server system utilizing the results of the first key exchange process if the second key exchange process is not successful because the client system becomes non-operational; and
  storing a security parameter for each of a plurality of client systems in a non-volatile storage, wherein each of the plurality of client systems, which are all coupled to the server, have a corresponding security parameter.

20. The method of claim 19, wherein the traffic communication between the server system and the client system is sent without security.

21. The method of claim 19, further including switching communications to a second server system if the server becomes non-operational.

22. A method of providing security mechanisms for securing traffic communication between a server system and a client system, the method comprising:
  detecting whether the client system is in an operational state;

executing first key exchange processes between the server system and the client system if the client system is in the operational state;

storing the results of the first key exchange processes into the client system;

inhibiting the stored results from being updated until a successful execution of a second key exchange processes between the server system and the client system; and using the stored results of the first key exchange processes to secure the traffic communication if the second key exchange processes are not successful if because the client system becomes non-operational, wherein using the stored results to secure the traffic communication further includes transmitting management Internet Protocol-based packets from the server system to the client system, if the client system is determined to be non-operational, to perform diagnostic operations on the client system.

23. The method of claim 22, wherein the transmission of management IP-based protocol packets causes the client system to re-boot.

24. The method of claim 23, wherein the management IP-based protocol packets are remote management and control protocol (RCMP) packets.

25. A client system, comprising:

logic for executing a first key exchange process between a server and the client system to product results;

a storage device to store the results of the first key exchange process;

logic for inhibiting the stored results of the first key exchange process from being updated until a second key exchange process is successful;

logic for updating the stored results of the first key exchange process if execution of second key exchange process is successful; and logic to secure the traffic communication between the client system and the server system utilizing the results of the first key exchange process if the second key exchange process is not successful because the client system becomes non-operational, wherein the securing of the communication traffic further includes logic for receiving management Internet Protocol-based packets from the server system if the client system is determined to be non-operational to perform diagnostic operations on the client system.

26. A computer network comprising:

a server system;

a client system;

logic for detecting whether the client system is in an operational state;

logic for executing a first key exchange process between the server system and the client system to produce results;

a storage device at the client system for storing the results of the first key exchange process;

logic for inhibiting the stored results of the first key exchange process from being updated until a successful execution of a second key exchange process between the server system and the client system;

logic for updating the stored results of the first key exchange process if the execution of the second key exchange process is successful;

logic to secure traffic communication between the client system and the server system utilizing the results of the first key exchange process if the second key exchange process is not successful because the client system becomes non-operational, and a plurality of client systems including the client system coupled to the server system, each of the plurality of client systems including a security parameter, wherein the server system includes a non-volatile storage for storing the security parameter for each of the plurality of client systems.

27. The computer network of claim 26, further including logic for allowing the traffic communication between the server system and the client system to be sent without security.

28. The computer network of claim 26, wherein the client system is a network device.

29. The computer network of claim 26, wherein the storage device is at least one of an Ethernet device, a coprocessor connected to an Ethernet device, and non-volatile storage that is part of an Ethernet device.

30. The computer network of claim 26, wherein the logic for inhibiting the stored results of the first key exchange process from being updated includes:

logic for sending a signal acknowledging the successful execution of another set of key exchange processes; and logic for sending a signal confirming receipt of the acknowledgement signal.

31. The computer network of claim 26, wherein the server system contains a storage device for storing the results of the first key exchange process and the second key exchange process.

32. The computer network of claim 26, further comprising logic for switching the server system to a second server system in the computer network if the server system becomes non-operational, security mechanisms securing traffic communication between the second server system and the client system.

33. A computer readable medium, the computer readable medium including computer readable instructions encoded thereon, which when executed cause a client system to:

execute a first key exchange process between a server and the client system to product results;

store results of the first key exchange process in a storage device;

inhibit the stored results of the first key exchange process from being updated until a second key exchange process is successful;

updating the stored results of the first key exchange process if execution of second key exchange process is successful; and securing the traffic communication between the client system and the server system utilizing the results of the first key exchange process if the second key exchange process is not successful because the client system becomes non-operational, wherein using the stored results to secure the traffic communication further includes receiving management Internet Protocol-based packets from the server system at the client system, if the client system is determined to be non-operational, to perform diagnostic operations on the client system.

34. The computer-readable medium of claim 33, wherein the traffic communication between the server system and the client system is sent without security.

35. The computer-readable medium of claim 33, which when executed cause the client system, to further include switching communications to a second server system if the server becomes non-operational.

36. A computer readable medium, the computer readable medium including computer readable instructions encoded thereon, which when executed cause a server system to:

determine whether a client system is in an operational state;

initiate a first key exchange process, at the server system, between the server system and the client system to produce results;

store the results, at the server system, of the first key exchange process;

inhibit the stored results of the first key exchange process from being updated until a successful execution of a second key exchange process between the server system and the client system;

update the stored results of the first key exchange process at the server system if the execution of the second key exchange process is successful;

secure traffic communication between the client system and the server system utilizing the results of the first key exchange process if the second key exchange process is not successful because the client system becomes non-operational; and store a security parameter for each of a plurality of client systems including the client system in a non-volatile storage, wherein each of the plurality of client systems, which are all coupled to the server system, have a corresponding security parameter.

* * * * *